Aug. 2, 1966  J. A. ERDLE  3,264,403
ELECTRICAL BUS BAR WITH NON-ADHERING PLASTIC INSERTS
Filed Oct. 15, 1963

INVENTOR.
JACK A. ERDLE
BY
ATTORNEY

United States Patent Office 3,264,403
Patented August 2, 1966

3,264,403
ELECTRICAL BUS BAR WITH NON-ADHERING PLASTIC INSERTS
Jack A. Erdle, Brighton, N.Y., assignor to Eldre Components, Inc., Rochester, N.Y., a corporation of New York
Filed Oct. 15, 1963, Ser. No. 316,256
9 Claims. (Cl. 174—72)

This invention relates to electrical bus bars, and particularly to laminated bus bars for distributing electrical power or signals to various parts of electrical apparatus. More specifically this invention relates to a laminated bus bar strip which is adapted to be severed intermediate its ends into one or more laminated sections of desired length.

Laminated bus bars, in general, are well known, and heretofore have been in use extensively in the wiring of modular and panel type electronic systems. Laminated bus bars are usually made up of strips of flat, ribbon-like conductors separated by substantially coextensive strips of insulating material. The conductors are provided with connector terminals, which project from the conductors at intervals along their lengths for connecting various other circuit components to the conductors at convenient points therealong.

A major advantage of conductors of this type is that they have controlled impedance, whereby the time, which normally would be taken to manufacture, install, and verify the impedance of an ordinary cable system, is eliminated. Moreover, they enable cumbersome cable harnesses to be replaced with neat, space-saving units. In addition, they have prepositioned terminals which may be readily connected when a unit is placed in position.

One of the major disadvantages of laminated bus bars as heretofore manufactured, however, has been that they have more or less to be made in custom-fit lengths for different jobs. When they are made in standard lengths and cut to fit the job the superposed conductors in the strip tend to short upon one another. The reason for this is that when a laminated bus bar is sheared or otherwise severed intermediate its ends, the shears, or similar cutting tool employed, tend to force the sheared ends of the superposed flat, ribbon-like strips of relatively soft brass or copper through intervening layers of plastic insulating material into contact with one another, thereby causing shorting along the line of shear.

It is an object of this invention to provide an improved laminated bus bar which will not "short out" upon being severed intermediate its ends.

Another object of this invention is to provide a laminated bus bar having improved means for insulating one conducting laminate from another in the bar.

Other objects of the invention will be apparent hereinafter from the specification, and from the recital of the appended claims, particularly when read in conjunction with the accompanying drawing.

Figure 1:
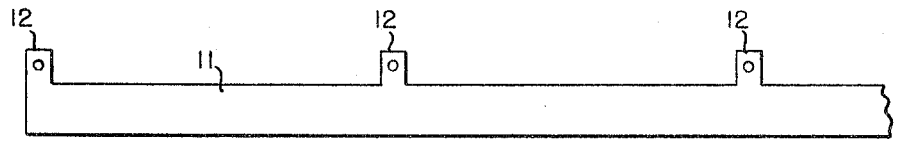
FIG. 1 is a side elevational view of a portion of a conductor strip which may be employed in a bus bar made according to one embodiment of this invention.

Referring now to the drawing by numerals of reference, 11 denotes an electrical conductor strip having a plurality of integral lugs or connector terminals 12 projecting from one side edge thereof at longitudinally spaced points therealong. Although the terminals 12 are illustrated by way of example as projecting from one side edge only thereof, it is to be understood that they may be made to project from opposite side edges of the strip, and instead of being integral therewith may be secured in any suitable fashion thereon.

One embodiment of my novel bus bar is designated generally at 13 in FIGS. 2 to 5, and comprises a plurality of conductor strips 14, 15, 16 and 17, each of which is substantially identical in configuration with the conductor strip 11, and each of which has opposite faces thereof coated with a thin film of plastic insulating material such as a polyethylene terephthalate commonly sold under the trademark "Mylar." As in the case of conductor 11, each of the strips 14, 15, 16 and 17 has thereon a plurality of longitudinally spaced lugs 18, 19, 20 and 21, respectively, which project laterally outwardly from one longitudinal side edge of a respective strip. The strips 14 to 17 are mounted in parallel, generally superposed relation to one another, but with successive strips slightly longitudinally offset from one another in the same direction, whereby the terminals on each strip are also longitudinally offset from the terminals on the remaining strips, and define, as shown by way of example at A, B, C, etc., a plurality of groups of spaced terminals at longitudinally spaced intervals along the bar 13.

Figure 2:
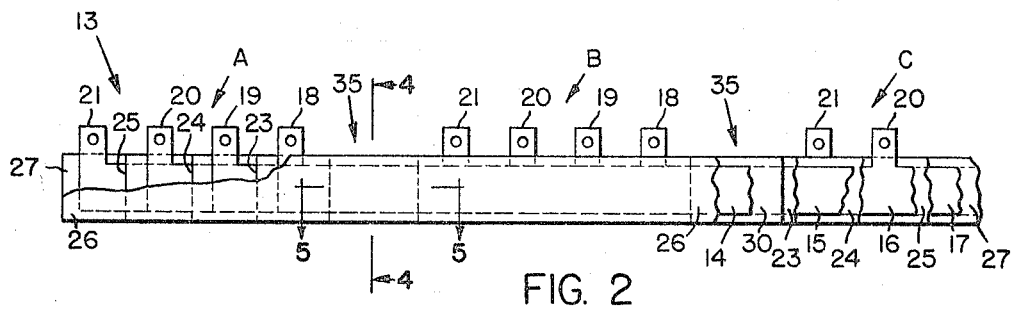
FIG. 2 is a fragmentary side elevational view of a laminated bus bar made in accordance with one embodiment of this invention from conductor strips of the type shown in FIG. 1, parts of the bar being cut away.
Figure 3:
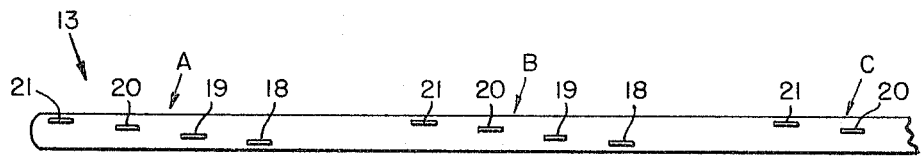
FIG. 3 is a fragmentary plan view of this bus bar.
Figures 4, 5:
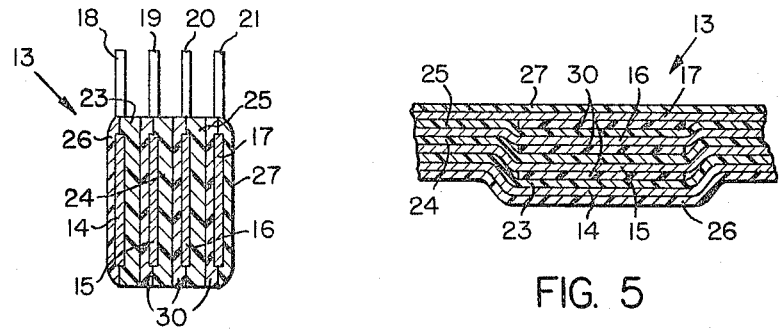
FIG. 4 is a greatly enlarged sectional view taken along the line 4—4 of FIG. 2 and looking in the direction of the arrows.
FIG. 5 is a fragmentary sectional view on an enlarged scale taken along the line 5—5 in FIG. 2 and looking in the direction of the arrows.

The confronting, Mylar coated faces of adjacent strips are separated by a thin layer of plastic insulating material such as the polyethylene terephthalate commonly sold under the trademark, "Dacron." These layers are designated at 23, 24, and 25, respectively. Two further layers 26 and 27, respectively, of Dacron insulating material are positioned over and cover the outer faces of the conductors 14 and 17, respectively. Each layer 23 to 27 of insulating material is approximately 0.005 of an inch thick, and is slightly wider than a respective conductor strip 14 to 17, so that the layers 23 to 27 overlap one another along the longitudinal side edges of the superposed conductor strips. The inner layers 23 to 25 are substantially equal in length to the conductor strips 14 to 17, but, as shown at the left in FIG. 2, are longitudinally offset relative to the strips which they separate, so that opposite ends thereof terminate between the ends of adjacent conductor strips. The outer insulating layers 26 and 27, however, are substantially longer than the conductor strips 14 to 17 so that they overlap one another at opposite ends of bus bar 13. The tough plastic layers 23 to 27 made of Dacron protect the Mylar coatings. Each layer of Dacron is impregnated with a phenolic resin, which functions as an adhesive or binder, when the resin is cured as below described. The phenolic resin also serves, upon being cured, to prevent the Dacron from absorbing moisture, which would decrease the insulating properties of the Dacron.

The superposed portions of the strips 14 to 17, which lie within the longitudinal spaces between the terminal groups A, B, C, etc., are further separated from one another by thin inserts 30 made of a non-adhering plastic material such as "Teflon" (tetrafluoroethylene). Each insert 30 is approximately .002 of an inch thick; is equal in width to a layer of Dacron insulation; and is approximately twice as long as it is wide.

There is a strip 30 between each pair of adjacent insulating strips at each section 35 of the assembly lying between the successive terminal groups A, B, C, etc. The sections 35 of the assembly between the different groups A, B, C, of terminals are therefore bulkier in thickness than the remainder of the bus bar assembly.

After the bus bar components are assembled as above described, the assembly is cured by heat so that the overlapping portions of the phenolic impregnated layers 23 to 27 of Dacron become bonded to one another along their longitudinal side edges, and adjacent the remote end portions of the superposed conductor strips, thereby preventing any lateral or longitudinal shifting of the pads 30 relative to the conductor strips. However, since the Teflon is nonadhering, it does not bond either to the phenolic impregnated insulating layers of Dacron, or to the Mylar coated surfaces of the conductor strips.

In use, my novel bus bar is made in standard lengths and can be cut to the desired length by severing the bar in any of the sections 35 between one of the spaced groups of terminals A, B, C, etc. When the bar 13 is severed in this manner, the shearing edge or edges of the cutting tool pass transversely through the registering Teflon inserts of the section 35, as well as through the intervening, registering portions of the conducting strips and Dacron insulation so that any severed portions of adjacent conductor strips will become embedded in the intervening Teflon strips 30. After the bar 13 has been cut to the desired length the inserts 30 are removed from the severed ends of the bar. This is easy because they are non-adhering and not bonded to the conducting strips or to the insulation. Thus, the possibility of shorting due to bending over of conducting strips into contact with one another during cutting of the bar is eliminated.

From the foregoing it will be apparent that applicant has devised a simple and inexpensive means for preventing undesirable "shorting" of adjacent conductor strips in laminated bus bars. This enables such bus bars to be made and sold in standard lengths; and cut to desired lengths for use. This eliminates waste and results in economies in manufacture.

While the invention has been described in connection with a specific embodiment thereof, it will be understood that it is capable of further modification, and this application is intended to cover any variations, uses, or adaptations of the invention following, in general, the principles of the invention and including such departures from the present disclosure as come within known or customary practice in the art to which the invention pertains and as may be applied to the essential features hereinbefore set forth, and as fall within the scope of the invention or the limits of the appended claims.

Having thus described my invention, what I claim is:
1. A laminated electrical bus bar comprising
 (a) a plurality of elongate, electrical conductor strips disposed in parallel, generally superposed relation,
 (b) relatively short, nonadhering, plastic, dielectric inserts disposed between adjacent strips for relatively short spaced sections of the lengths of said strips, the inserts between any two adjacent strips being spaced from one another in the direction of the length of said two adjacent strips,
 (c) an elongate layer of dielectric material longitudinally coextensive with and interposed between adjacent strips to insulate said strips electrically from one another along their lengths, and
 (d) at least two further, elongate layers of dielectric material disposed, respectively, over the outer faces of the two outermost of said superposed strips,
 (e) said layers of dielectric material having marginal edge portions which project beyond the longitudinal edges of said strips, and which are secured to one another to hold said strips and said inserts against movement relative to one another, and
 (f) said strips and layers being adapted to be severed across any of said sections to permit removal of said inserts with any fragments from the severed ends of adjacent conductor strips embedded therein, thereby preventing shorting of the strips on one another when the bus bar is in use.

2. An electrical bus bar as defined in claim 1, wherein
 (a) said inserts are made from tetrafluoroethylene, and (b) said layers are made from a plastic impregnated with a phenolic resin.

3. An electrical bus bar comprising
 (a) a plurality of elongate, electrical conductor strips secured in parallel, superposed relation to one another,
 (b) a plurality of spaced, electrical terminals projecting transversely outwardly from at least one longitudinal side edges of each of said strips,
 (c) a plurality of elongate layers of plastic dielectric material, one of said layers being interposed between and contacting and separating each pair of adjacent strips from one another to insulate said strips electrically from one another along their lengths, and
 (d) a series of relatively short, thick inserts, at least one of said inserts being interposed between one of said strips of each pair and the layer of insulation which separates said one strip from the next adjacent strip, and each of said inserts longitudinally offset relative to the terminals on said strips,
 (e) each of said inserts being substantially thicker and shorter than each of said layers of said insulation, and
 (f) said inserts being equi-spaced longitudinally inwardly from one end of said bar so that they align with one another at a point where the bar is adapted to be severed.

4. An electrical bus bar as defined in claim 3 wherein said inserts are made of a non-adhering plastic material, and are removable from the bar, when the latter is severed at said point.

5. An electrical bus bar as defined in claim 3 wherein said inserts are made of dielectric plastic material.

6. An electrical bus bar comprising
 (a) a plurality of elongate, electrical conductor strips secured in parallel, superposed relation to one another,
 (b) a plurality of spaced, electrical terminals projecting transversely outwardly from at least one longitudinal side edge of each of said strips,
 (c) a plurality of elongate layers of plastic dielectric material, there being at least one of said layers interposed between and separating each pair of adjacent strips to insulate said strips electrically from one another along their lengths, and
 (d) a series of relatively short, thick inserts, there being at least one of said inserts interposed between one of said strips of each pair and the layer of insulation which separates said one strip from the next adjacent strip, and each of said inserts being longitudinally offset relative to the terminals on said strips,
 (e) each of said inserts being substantially thicker and shorter than each of said layers of said insulation,
 (f) said inserts being equi-spaced longitudinally inwardly from one end of said bar so that they align with one another at a point where the bar is adapted to be severed,
 (g) said terminals being located in longitudinally spaced groups along said bar,
 (h) each of said groups including one terminal from each of said strips,
 (i) the terminals in each of said groups being longitudinally offset from the other terminals in the group, and
 (j) at least one further series of said inserts being longitudinally spaced from said first series to define at least one further point where said bar is adapted to be severed,
 (k) each of said series of inserts being positioned along said bar to lie in one of the spaces between said groups of terminals.

7. An electrical bus bar as defined in claim 3, wherein
 (a) said layers of insulation comprise strips of polyethylene terephthalate impregnated with a phenolic resin, and are bonded to one another along the longitudinal side edges of said conductor strips, and (b) each of said inserts is made of tetrafluoroethylene, and is operative upon the severance of the bar at said point to prevent the sheared ends of adjacent conductor strips from engaging and shorting out one another.

8. A laminated electrical bus bar comprising (a) at least two, elongate, electrical conductor strips, (b) means securing said strips together with at least portions of said strips disposed in parallel, superposed relation to one another, (c) a plurality of spaced terminals projecting transversely outwardly from at least one longitudinal side edge of each of said superposed portions of said strips, the terminals on each of said portions being longitudinally offset relative to the terminals on the other of said portions, and successive terminals on each of said portions registering with the spaces between successive terminals on the other said portions, (d) said means including an elongate, relatively thin layer of plastic, dielectric material interposed between and insulating said superposed portions of said strips from one another along their lengths, and (e) at least one further layer of plastic, dielectric material, substantially thicker and shorter than the first-named layer, and interposed between said first-named layer and one of said strips to extend across the space between a pair of said longitudinally offset terminals at a point where said bar is adapted to be severed, (f) said first-named layer being between and in contact with the confronting faces of said superposed portions of said strips at opposite ends of said further layer, thereby to hold said further layer against movement between said strips.

9. A laminated electrical bus bar as defined in claim 8 wherein (a) said first-named layer is made from polyethylene terephthalate impregnated with a phenolic resin, and is slightly wider than said strips so that it projects outwardly beyond the longitudinal side edges of said strips, (b) said further layer is made from tetrafluoroethylene, and said means further includes (c) two further layers, similar to said first-named layer, and which are positioned over and insulate the outer faces of said superposed portions of said strips, and which are secured along the longitudinal side edges thereof to the projecting longitudinal side edges of said first-named layer.

References Cited by the Examiner
UNITED STATES PATENTS

| | | |
|---|---|---|
| 1,161,989 | 11/1915 | Skinner. |
| 1,999,137 | 4/1935 | Flewelling _____ 174—72 |
| 2,955,147 | 10/1960 | Carlson _____ 174—88 X |
| 3,123,422 | 3/1964 | Mock et al. _____ 339—275 X |
| 3,126,240 | 3/1964 | Christensen et al. _____ 339—22 |
| 3,162,717 | 12/1964 | Lentz _____ 174—117 X |

LARAMIE E. ASKIN, *Primary Examiner.*

JOHN F. BURNS, *Examiner.*

W. B. FREDRICKS, *Assistant Examiner.*